Masayasu Arikawa,
Izumi Ichihara,
Naoki Okuda,
*Inventors*

By *Hall + Houghton*
Attorney

3,153,719
SUBMERGED WELDING AND DEPOSITED METAL
Masayasu Arikawa, Nada-ku, Kobe, Izumi Ichihara, Nishinomiya, and Naoki Okuda, Nada-ku, Kobe, Japan, assignors to Kobe Steel Works, Ltd., Fukiai-ku, Kobe, Japan
Filed Aug. 4, 1961, Ser. No. 129,292
3 Claims. (Cl. 219—73)

This invention relates to improvements in submerged arc welding and also in a flux to be used in the submerged arc welding. This invention also relates to a metal deposit obtained by the improved submerged arc welding method.

As well known, submerged arc welding is usually carried out by contacting or abutting two base metal bodies that are to be welded in such a way as to form a groove (usually of V or like shape) therebetween, piling up a flux upon and covering this groove, submerging the tip portion of a welding bar into the flux and generating an electric arc continuously between the welding bar and the base metal body.

In such submerged arc welding method it has been conventional to employ an acidic flux by mixing such ingredients as $SiO_2$, $MnO$, $CaO$, $Al_2O_3$, $TiO_2$, $MgO$, $BaO$, $Na_2O$, $K_2O$, etc. in such proportions and combination that the resulting flux becomes acidic. The conventional acidic flux has been excellent in welding working, but on the other hand it has drawbacks that the deposited metal produced by the submerged arc welding is poor in certain properties, particularly in impact value.

It has been found that a metal deposit formed by the conventional submerged arc welding wherein a conventional acidic flux is employed has an oxygen content higher than that of a base metal body or steel which is to be welded by the submerged arc welding and which has been manufactured by an open furnace, electric furnace, high frequency furnace, and this fact is responsible for the poor impact value of the metal deposit. We have further found that the high oxygen content of the deposited metal obtained by the conventional submerged arc welding is caused by the fact that the flux employed is generally acidic.

The present invention is based upon these findings and has been accomplished through various subsequent researches and discoveries. Thus, it has further been found that, in submerged arc welding, if a basic flux is employed the oxygen content of the metal deposit obtained is lowered, and also that there is an interrelation between the basicity of the flux and the oxygen content of the metal deposit. More particularly, we have found that when a submerged arc welding is carried out with a flux so prepared by varying the proportions of various ingredients employed in the conventional acidic fluxes or by incorporating basic ingredient(s) into the conventional acidic flux as to result in a basic type, the oxygen content of the metal deposit obtained can be lowered without impairing the welding performance or workability; and that the higher the basicity in the flux is made, the lower the oxygen content of the metal deposit produced will be.

Therefore, the present invention provides an improved submerged arc welding flux whose ingredients are so selected and proportioned that the resulting flux as a whole becomes basic, a submerged arc welding method using such basic flux and also an excellent metal deposit formed by the improved submerged arc welding.

Briefly, a basic flux according to this invention comprises basic flux ingredients, acidic flux ingredients and alloying components (deoxidizing agents). As for acidic and basic ingredients any conventional ones such as $SiO_2$, $MnO$, $CaO$, $Al_2O_3$, $TiO_2$, $MgO$, $BaO$, $Na_2O$, $K_2O$, $CaCO_3$, $CaF_2$, dolomite $(CaMg)CO_3$, magnesite, etc. which have conventionally been used as components of conventional acidic submerged arc welding fluxes and conventional basic coating agents for electric arc welding bars may be used. A neutral component such as fluor-spar may also be incorporated if desired. The combination and proportions of the various components are not critical except that the alloying metal(s) or deoxidizing agent(s) is essential and that the acidic components such as silica, alumina, rutile, etc. and the basic components such as lime, lime stone, dolomite, magnesia, etc. must be so combined and proportioned as to render the resulting flux basic, preferably strong basic.

As for the alloying (or deoxidizing) elements, ferromanganese, ferrosilicon, metallic nickel, metallic aluminum, ferromolybdenum, etc. which are well known in the art may be employed depending upon the particular metal base bodies to be welded. However, any steel to be welded usually contains Mn and Si, and therefore the use of Mn and Si elements or substances which can produce alloyable Si and Mn elements in the welding are required.

Some examples of carrying out the present invention will be explained in detail with reference to the accompanying drawings wherein.

Figure 1:
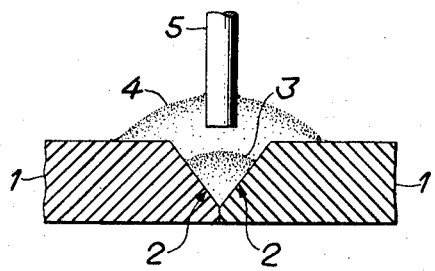
FIG. 1 is a schematic section of an area where a submerged arc welding according one embodiment of this invention is being carried out.

Referring to FIG. 1, base steel bodies 1, 1 to be welded are contacted or abutted as shown in such a manner that there is formed V shaped groove 2 therebetween. In this groove 2, a suitable amount of a basic flux 3 is first placed which is then covered with a pile of an acidic flux 4. The lower end portion of a welding bar 5 is buried or submerged in the flux as well shown and a submerged arc welding is carried out in a conventional manner.

Figure 2:
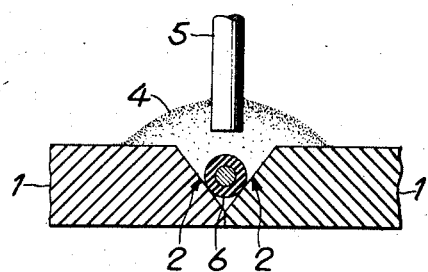
FIG. 2 is a similar view but showing another mode of working of this invention.
Figure 3:
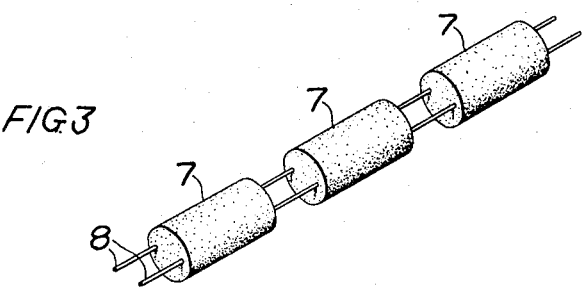
FIG. 3 is a perspective view of a preformed basic flux mass useful in carrying out the present invention.

Another embodiment is shown in FIG. 2. This embodiment is different from that shown in FIG. 1 only in that, in place of the flux 3, there is employed an arc welding bar 6 placed along and on the bottom of the groove 2, said bar 6 being coated with a basic flux.

In place of the basic flux coated welding bar 6 shown in FIG. 2, there may be used basic flux lumps 7, 7, 7 that are connected at intervals with iron wires 8.

In all of the above illustrated embodiments the basic flux and acidic flux are separately placed or arranged. However, it is also possible to mix the acidic flux and basic flux and to form the mixture into free flowing small particles (each particle containing both acidic flux and basic flux) by means of a suitable granulator. The groove 2 is filled up and covered by the particles.

Any other suitable arrangement can be taken in employing the flux of this invention.

In any case, desired alloying element(s) is incorporated into the basic flux and/or acidic flux, or into each particle mentioned above.

Furthermore, in any case, the basic flux ingredients and the acidic flux ingredients must be so proportioned or selected as to render the resulting flux (as a whole) basic, preferably strong basic.

According to this invention, there is obtained a metal deposit containing less than 0.05% oxygen and having a high impact value. Particularly, when the flux is made strongly basic by increasing the content of the basic flux ingredients, there is obtained a metal deposit having an impact value higher than 6 kg. m./cm.$^2$ at 0° C. In any case, the deposited metal obtained in this invention is less than 0.05% in the oxygen content and more particularly it is possible to produce a high impact value metal deposit containing less than 0.05% of oxygen, less than 0.20% of carbon, more than 0.40% manganese and more than 0.15% of silicon.

To illustrate the features and advantages of this invention over the prior arts, three tables are given below in which Table I shows the various components of some fluxes of this invention as compared with conventional fluxes, Table II shows the analyzing results of metal deposits obtained by submerged arc welding by the use of the fluxes indicated in Table I, and Table III gives the mechanical properties of said metal deposits. In each case, the flux ingredients were granulated into small particles and the submerged arc welding was carried out by filling and covering the groove with the particles. The steel plate (C 0.20, Mn 0.7, P 0.032, S 0.035) welded was 25 mm. in thickness, and the welding was carried out on both sides one layer (surface pass; 900 a. x 32 v. x 280 mm./min., back pass; 750 a. x 32 v. x 280 mm./min.).

*Table I*

|  | Flux on the market | | | Flux of this invention | | | |
|---|---|---|---|---|---|---|---|
| Flux No. | 1 | 2 | 3 | 4 | 5 | 6 | 7 |
| Elements of flux: | | | | | | | |
| Lime | 31.8 | 6.2 | 25.3 | 44.0 | 3.1 | 46.0 | 3.1 |
| Lime stone | | | | | 25.0 | | 48.3 |
| Fluor spar | 1.5 | 5.0 | 3.4 | 7.9 | 7.5 | | 7.2 |
| Silica | 54.5 | 40.2 | 38.0 | 10.8 | 19.2 | 7.2 | 10.6 |
| Magnesia | 9.2 | 0.9 | 12.1 | 2.1 | 12.0 | | 15.3 |
| Rutile | 0.2 | | 0.6 | 0.3 | 3.5 | | 5.3 |
| Alumina | 3.8 | 3.4 | 10.6 | 39.6 | 7.6 | 41.0 | 12.8 |
| Ferro-manganese | | ¹ 40.7 | ¹ 7.2 | | 1.2 | 2.5 | 1.5 |
| Ferro-silicon | | | | 4.0 | 7.5 | 5.0 | 7.5 |

¹ MnO.

*Table II*

| Flux No. | 1 | 2 | 3 | 4 | 5 | 6 | 7 |
|---|---|---|---|---|---|---|---|
| Chemical analysis (percent) of the metal deposit: | | | | | | | |
| C | 0.08 | 0.09 | 0.07 | 0.09 | 0.11 | 0.07 | 0.08 |
| Mn | 0.07 | 0.85 | 0.92 | 0.81 | 0.89 | 0.81 | 0.69 |
| Si | 0.40 | 0.20 | 0.28 | 0.22 | 0.36 | 0.30 | 0.23 |
| P | 0.014 | 0.014 | 0.013 | 0.017 | 0.016 | 0.019 | 0.015 |
| S | 0.019 | 0.017 | 0.015 | 0.009 | 0.018 | 0.016 | 0.016 |
| Ni | 0.09 | 0.10 | 0.08 | 0.12 | 0.11 | 0.08 | 0.09 |
| Cr | 0.16 | 0.07 | 0.04 | 0.06 | 0.07 | 0.05 | 0.06 |
| O | 0.08 | 0.079 | 0.081 | 0.050 | 0.034 | 0.040 | 0.028 |

*Table III*

| Flux No. | 1 | 2 | 3 | 4 | 5 | 6 | 7 |
|---|---|---|---|---|---|---|---|
| Tensile strength, g./mm.$^2$ | 48.7 | 46.4 | 45.9 | 49.1 | 49.6 | 51.3 | 48.9 |
| Percentage elongation | 23.5 | 24.3 | 27.0 | 24.0 | 25.3 | 24.4 | 26.5 |
| Impact value 2 mm. V notch surface center side (average) | 3.6 | 4.1 | 4.6 | 7.3 | 7.6 | 8.9 | 10.2 |

For further illustrating the invention as compared with prior acidic flux, the following Table IV is given. This table indicates various ingredients employed for various fluxes, composition of metal deposits obtained by submerged arc welding with these fluxes and the mechanical properties of the metal deposits. In each case the welding was carried out on both sides one layer (surface pass; 850 a. x 33 v. x 300 mm./min.) for 60 kg. higher tensile steel (C 0.13, Mn 1.24, Si 0.35, P 0.010, S 0.014, Cr 0.40, Ni 0.19, V 0.12).

*Table IV*

| Kind of flux | Acidic flux | Basic flux | Flux of this invention | Flux of this invention |
|---|---|---|---|---|
| Percentage of component elements of flux: | | | | |
| Lime | 2.3 | | | |
| Lime stone | | 36.1 | 44.0 | 48.0 |
| Dolomite | | 12.1 | 15.0 | 21.0 |
| Fluorspar | 3.4 | 15.5 | 8.3 | 10.0 |
| Silica | 38.0 | 20.1 | 10.4 | 3.5 |
| Magnesia | 12.1 | 11.3 | 15.2 | 10.2 |
| Alumina | 10.6 | 1.5 | 1.5 | 1.0 |
| Ferro-manganese | 0.4 | 0.4 | 0.4 | 0.4 |
| Ferro-silicon | | 8.5 | 8.5 | 8.5 |
| Rutile | 0.6 | 9.0 | 6.0 | 10.4 |
| Metallic nickel | 5.1 | 5.1 | 5.1 | 5.1 |
| Ferro-molybdenum | 1.2 | 1.2 | 1.2 | 1.2 |
| C | .09 | .08 | .09 | .08 |
| Mn | .87 | .91 | .96 | .90 |
| Percentage of chemical elements of deposited metal: | | | | |
| Si | 0.44 | 0.51 | 0.470 | 0.49 |
| P | 0.019 | 0.020 | 0.018 | 0.021 |
| S | 0.013 | 0.014 | 0.013 | 0.015 |
| Ni | 0.96 | 0.87 | 0.91 | 0.87 |
| Cr | 0.24 | 0.25 | 0.21 | 0.23 |
| Mo | 0.18 | 0.22 | 0.23 | 0.20 |
| V | 0.06 | 0.07 | 0.06 | 0.08 |
| O | 0.080 | 0.061 | 0.044 | 0.020 |
| Mechanical properties: | | | | |
| Tensile strength, kg./mm.$^2$ | 62.4 | 65.5 | 67.3 | 64.4 |
| Percentage elongation | 23.3 | 21.4 | 25.3 | 23.4 |
| Impact value surface center side 2 mm. notch (average) | 4.6 | 3.6 | 7.9 | 10.8 |

As above mentioned, the improved submerged arc welding method of this invention can be very easily put into practice and the deposited metal produced by this method is superior in its tensile strength and percentage elongation to the deposited metal made by the conventional welding method. Especially, the metal deposit of this invention is remarkably superior to the prior one in impact value.

What we claim is:

1. A method of submerged arc welding for producing metal deposits of improved characteristics in work shaped to afford a groove in which the welding metal is deposited, which method comprises effecting the submerged arc welding under a body of submerging flux which has been formed by depositing basic flux ingredients in the groove and by covering over the same with acidic flux ingredients, the quantity of basic flux ingredients in said body being sufficient to render the resulting flux in contact with the weld basic as a whole.

2. A method of submerged arc welding for producing metal deposits of improved characteristics in work shaped to afford a groove in which the welding metal is deposited, which method comprises effecting the submerged arc welding under a body of submerging flux which has been formed by placing along and in the bottom of the groove an arc welding bar coated with basic flux and by piling up acidic flux thereover, the quantity of basic flux being sufficient to render the resulting flux in contact with the weld basic as a whole.

3. A method of submerged arc welding for producing metal deposits of improved characteristics in work shaped to afford a groove in which the welding metal is deposited, which method comprises effecting the submerged arc welding under a body of submerging flux which has been formed by placing along and in the bottom of the groove a plurality of lumps of basic flux connected together by means of iron wire and by piling up acidic flux thereover, the quantity of basic flux being sufficient to render the resulting flux in contact with the weld basic as a whole.

References Cited by the Examiner

UNITED STATES PATENTS

| | | | |
|---|---|---|---|
| 1,501,266 | 7/24 | Brace | 219—146 |
| 1,589,017 | 6/26 | Lincoln | 219—74 |
| 2,043,960 | 6/35 | Jones et al. | 219—73 |
| 2,200,737 | 5/40 | Clapp | 219—73 |
| 2,260,775 | 10/41 | Fritzsch | 219—73 |
| 2,308,194 | 1/43 | Miller | 219—73 |
| 2,511,976 | 6/59 | Frost | 219—73 |
| 2,909,642 | 10/59 | Landis | 219—73 |
| 3,100,829 | 8/63 | Kubli et al. | 219—73 |

RICHARD M. WOOD, *Primary Examiner.*